United States Patent
Willerton et al.

(10) Patent No.: US 7,983,818 B2
(45) Date of Patent: Jul. 19, 2011

(54) ARRANGEMENT FOR TRIGGERING A VEHICLE SAFETY DEVICE

(75) Inventors: Mark Willerton, Vadstena (SE); Erb Yannick, Eragny sur Oise (FR)

(73) Assignee: Autoliv Development AB, Vargarda (SE)

( * ) Notice: Subject to any disclaimer, the term of this patent is extended or adjusted under 35 U.S.C. 154(b) by 747 days.

(21) Appl. No.: 11/632,892

(22) PCT Filed: Jul. 1, 2005

(86) PCT No.: PCT/SE2005/001053
§ 371 (c)(1), (2), (4) Date: Feb. 18, 2008

(87) PCT Pub. No.: WO2006/009499
PCT Pub. Date: Jan. 26, 2006

(65) Prior Publication Data
US 2008/0215211 A1 Sep. 4, 2008

(30) Foreign Application Priority Data
Jul. 19, 2004 (GB) .................................. 0416131.1

(51) Int. Cl.
*B60R 22/00* (2006.01)

(52) U.S. Cl. .......................................... 701/45; 180/282
(58) Field of Classification Search .................... 701/45; 180/274, 282; 280/735
See application file for complete search history.

(56) References Cited

U.S. PATENT DOCUMENTS

| 5,748,477 A | 5/1998 | Katoh |
| 5,835,007 A * | 11/1998 | Kosiak ........................... 340/436 |
| 5,916,289 A * | 6/1999 | Fayyad et al. ................... 701/45 |
| 6,271,747 B1 | 8/2001 | Fendt et al. |
| 6,487,482 B1 * | 11/2002 | Mattes et al. ................... 701/45 |
| 2003/0076981 A1* | 4/2003 | Smith et al. ................... 382/104 |
| 2003/0093201 A1 | 5/2003 | Schubert et al. |
| 2003/0100983 A1* | 5/2003 | Bullinger et al. .............. 701/45 |
| 2004/0034458 A1* | 2/2004 | Erb ................................ 701/45 |

FOREIGN PATENT DOCUMENTS

| GB | 2 369 708 | 5/2002 |
| WO | WO 2004/035356 A1 | 4/2004 |

OTHER PUBLICATIONS

Great Britain Search Report—Oct. 20, 2004.

* cited by examiner

*Primary Examiner* — Eric Culbreth
(74) *Attorney, Agent, or Firm* — Brinks Hofer Gilson & Lione

(57) ABSTRACT

An arrangement is provided for triggering a vehicle safety device. A proximity sensor (1) provides an output related to a distance to an object and/or the relative speed between the object and the sensor. A main accelerometer (2) is sensitive to acceleration in a predetermined direction. A supplementary accelerometer (3) is also provided. A first processing arrangement (4) performs an algorithm with the main algorithm, and is connected to receive an input from the proximity sensor and from the main accelerometer and to provide an output to a triggering signal generator (5). There is a second processing arrangement (7) which receives a signal from the main accelerometer (2) and also from the supplementary accelerometer (3). The second processing arrangement also provides an output connected to the said signal generator (5) to generate the triggering signal.

19 Claims, 3 Drawing Sheets

ARRANGEMENT FOR TRIGGERING A VEHICLE SAFETY DEVICE

CROSS REFERENCE TO RELATED APPLICATIONS

This application claims priority to GB 0416131.1 filed Jul. 19, 2004 and PCT/SE2005/001053 filed Jul. 1, 2005.

FIELD OF THE INVENTION

The present invention relates to an arrangement for triggering a motor vehicle safety device such as, for example, an airbag or a pretensioner.

BACKGROUND OF THE INVENTION

To avoid inadvertent triggering of a safety device it has been proposed to utilize two units, namely an arming unit and a crash sensing unit, to produce, respectively, an arming signal and a crash signal, the safety device being triggered only when the arming signal and crash signal are present simultaneously. An arrangement of this type is intended to reduce the risk that a single mechanical or electrical error might lead to an inadvertent triggering of the safety device.

The arming unit may comprise a simple acceleration sensor which generates the arming signal if the acceleration exceeds a predetermined level. Alternatively the arming unit may include one or more sensors and a processing unit which performs a predetermined algorithm, the arming algorithm, on the signal or signals received from the one or more sensors to provide the appropriate output.

The crash sensing unit may again comprise a simple acceleration sensor which generates a signal if the acceleration exceeds a predetermined level, but again the crash sensing unit may comprise one or more sensors associated with a processor which is configured to perform an algorithm, the crash algorithm, on the signal or signals received from the one or more sensors to provide the appropriate output.

The crash sensing unit typically includes a sensor which is directionally sensitive, the sensitive direction of the accelerometer being aligned with the crash direction which is to be sensed by the sensor. The crash algorithm may be determined by whether or not the acceleration sensed by the accelerometer, acceleration "a" or its integrated value over time, $\Delta v$ exceed a predetermined threshold.

It has been proposed to use the signal from a proximity sensor such as a radar configured to provide an output related to the distance to an object and/or the relative speed between the object and the sensor, to improve the ability to discriminate between different potential crashes, so as, for example, to discriminate between a potentially dangerous crash and a potentially not dangerous crash. If a doppler radar is utilized, an output can easily be provided which represents the relative velocity $v_{rel}$ between the sensor and a nearby obstacle. If a pulse radar is used, the time delay of the reflected pulse will provide an indication of the distance to the object. Repeated measurements of the distance at short time intervals can enable the relative velocity $v_{rel}$ to be calculated, for example by differentiation of the measured distance with respect to time.

It has been suggested, for example in U.S. Pat. No. 5,835,007, to utilize an anticipatory crash sensor of the radar type in conjunction with an accelerometer, with the threshold value of acceleration being calculated in dependence upon the signal from the anticipatory crash sensor.

It has been found that the use of a proximity sensor may not result in the required impact prediction. If an arrangement for triggering a vehicle safety device is arranged so that a signal from a proximity sensor is essential for the triggering signal to be generated, then should the proximity sensor fail to provide an appropriate signal (for example if it fails to "see" the object), the corresponding triggering signal will not be generated. This is clearly disadvantageous.

The present invention seeks to revise an improved arrangement for triggering a vehicle safety device.

SUMMARY OF THE INVENTION

According to the present invention, there is provided an arrangement for triggering a vehicle safety device, the arrangement incorporating a proximity sensor configured to provide an output related to a distance to an object and/or the relative speed between the object and the sensor, a main accelerometer sensitive to acceleration in a predetermined direction, and a supplementary accelerometer, wherein there is a first processing arrangement to perform an algorithm, the main algorithm, the first processing arrangement being connected to receive an input from the proximity sensor and an input from the main accelerometer and to provide an output to a triggering signal generator, there being a second processing arrangement, the second processing arrangement being connected to receive a signal from the main accelerometer and a signal from the supplementary accelerometer, the second processing arrangement being provided with an output connected to the signal generator to generate the triggering signal.

Conveniently the proximity sensor is considered to provide an output related to distance or relative speed, with the distance or relative speed being determined in the predetermined direction.

In one embodiment the predetermined direction is substantially parallel with the longitudinal axis of a vehicle on which the arrangement is mounted.

In another embodiment the predetermined direction is substantially parallel with the transverse axis of a vehicle on which the arrangement is mounted.

Conveniently the proximity sensor is a radar. In one embodiment, the radar may be a doppler radar.

Advantageously the first processing arrangement is configured to perform a first crash algorithm and a first arming algorithm, and is configured to pass a signal to the signal generator only if a signal is generated simultaneously from the first crash algorithm and the first arming algorithm.

Conveniently the first crash algorithm is performed on at least a signal received from the proximity sensor and wherein the first arming algorithm is carried out on at least a signal from the main accelerometer.

In one embodiment the first crash algorithm is also performed on a signal received from the main accelerometer and the first arming algorithm is also carried out on a signal from the proximity sensor.

Preferably separate hardware units are provided as the processing arrangements to perform the first crash algorithm and the first arming algorithm.

Alternatively one or more software controlled processors are provided as the processing arrangements to perform the algorithms.

Advantageously the second processing arrangement is configured to perform a second crash algorithm and a second arming algorithm, and is configured to pass a signal to the signal generator only if a signal is generated simultaneously from the second arming algorithm and the second crash algorithm.

Conveniently the arrangement additionally comprises a further sensor configured to generate a signal representative of the actual vehicle velocity, wherein the second arming algorithm is performed on the signal from the additional accelerometer; and wherein the second crash algorithm is performed on at least a signal from the main accelerometer.

In one embodiment the second crash algorithm is also performed on a signal from the additional sensor.

Preferably the second arming algorithm is also performed on a signal received from the main accelerometer.

Advantageously separate hardware units are provided to perform the second arming algorithm and the second crash algorithm.

Alternatively one hardware unit is provided to perform the first and second crash algorithms and another hardware unit is provided to perform the first and second arming algorithms.

Conveniently the separate hardware units are mounted on respective separate printed circuit boards.

Alternatively one or more software controlled processors are provided to perform the algorithms.

BRIEF DESCRIPTION OF THE DRAWINGS

In order that the invention may be more readily understood, and so that further features thereof may be appreciated, embodiments of the invention will now be described with reference to the accompanying drawings in which.

DETAILED DESCRIPTION

In the described embodiments of the invention there are various processor units and logic gates. The processor unit and gates perform specific processing or logic functions, but in alternative embodiments these functions may be performed in different ways, using discrete components, integrated circuits, or one or more processors controlled by appropriate software. Thus each described processor unit or gate is one example of a processor or logic arrangement that provides the required functionality.

Figure 1:
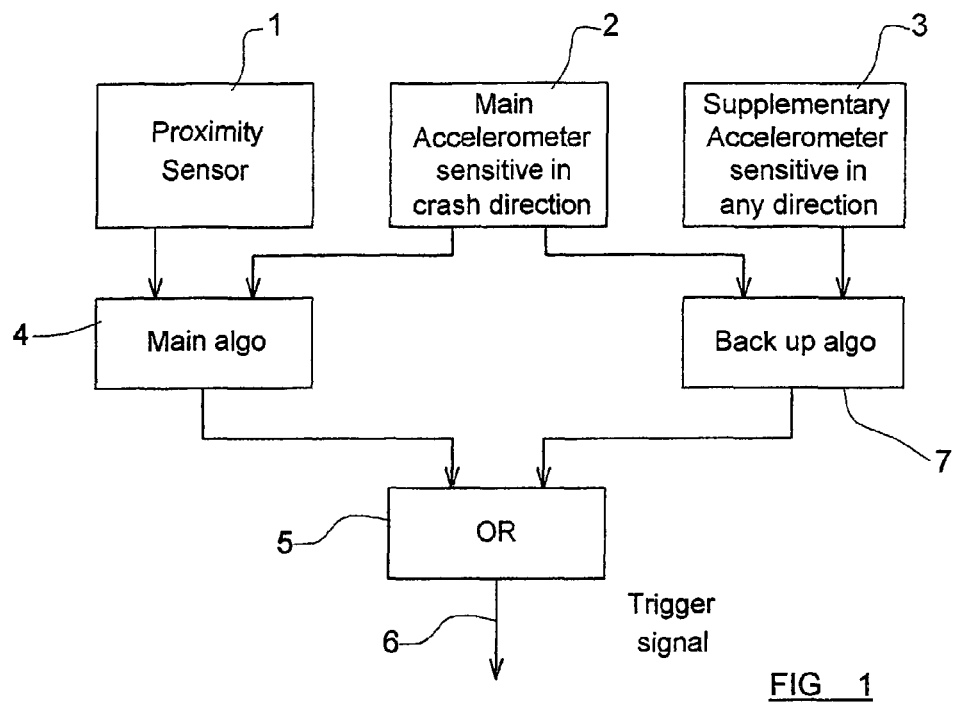
FIG. 1 is a block diagram of one embodiment of the invention.

Referring initially to FIG. 1 of the accompanying drawings, an arrangement for triggering a vehicle safety device includes a proximity sensor 1 which is a sensor configured to provide an output related to the distance to an object and/or the relative speed between the object and the sensor. The proximity sensor 1 may be optical or acoustic but in a preferred embodiment the proximity sensor 1 is a radar, and may be a pulse radar or doppler radar. The proximity sensor 1 is preferably configured to provide an output of distance of relative speed as measured in a predetermined direction, which is aligned with the anticipated direction of an anticipated accident. The direction may be the direction of the longitudinal axis of the vehicle (the direction of forward motion of the vehicle).

The arrangement also incorporates a first main accelerometer 2, which, in this embodiment, is an accelerometer which has particular sensitivity in the predetermined direction, thus the accelerometer is mounted in a vehicle so that the direction is aligned with the direction of sensitivity of an anticipated accident. Thus, if the arrangement is to trigger a vehicle safety device which is to be actuated when there is a frontal impact, the accelerometer 2 will be oriented so that the direction of sensitivity of the accelerometer is parallel with the longitudinal axis of the vehicle.

If the arrangement is to trigger a vehicle safety device which is to be deployed in the event of a side impact, then the proximity sensor 1 and the accelerometer 2 will be mounted in position so that the predetermined direction extends parallel to the transverse axis of the vehicle.

The described arrangement incorporates a second supplementary accelerometer 3. In this embodiment the second accelerometer 3 need not have a particular direction of sensitivity. However, the second accelerometer 3 may be an accelerometer which has a particular direction of sensitivity, the accelerometer being mounted so that its direction of sensitivity is perpendicular to the direction of sensitivity of the main accelerometer 2, which has its direction of sensitivity aligned with the direction of the crash to be sensed. Thus the direction of sensitivity of the second accelerometer is transverse to the direction of the crash to be sensed.

Consequently it is to be understood that the second supplementary accelerometer 3 may be an accelerometer which is provided primarily to sense a different type of crash. The main accelerometer 2 may thus, in one example, be an accelerometer located to detect a frontal crash and the supplementary accelerometer 3 may be an accelerometer provided primarily to sense a side crash.

Here it is to be understood that an accelerometer which may have a particular direction of sensitivity, will also respond to an impact in another direction, as the impact will cause vibrations and acceleration within the vehicle having components in all directions.

The arrangement incorporates a first processor unit 4. The first processing unit 4 receives a signal from the proximity sensor 1 and also receives a signal from the main accelerometer 2.

The processor unit 4 is arranged or programmed to perform an algorithm, the "main algorithm", on an input signal from the proximity sensor 1 and an input signal from the main accelerometer 2, and produces an output which is supplied to an OR-gate 5.

The output of the OR-gate 5 is a trigger signal 6 which is used to trigger a vehicle safety device.

A second processing unit 7 is provided, which is programmed to perform an algorithm, the "back-up algorithm". The second processing unit 7 is connected to receive an input signal from the main accelerometer 2 and also a signal from the supplementary accelerometer 3. The output of the second processor 7 is connected as an input to the OR-gate 5.

The first processor unit 4 and the second processor unit 7 in the described embodiment formed as totally separate hardware units, and the units are preferably mounted on separate discrete printed circuit boards.

It is to be appreciated that when the first processor unit 4 receives an appropriate input signal from the proximity sensor 1 and also an appropriate signal from the main accelerometer 2, the output, when the main algorithm is performed, is supplied to the OR-gate 5. The output will pass through the OR-gate 5 which acts as a signal generator responsive to an input from the processor unit 4 to produce the output trigger signal 6.

Should, for some reason, the proximity sensor 1 fail to operate appropriately in an accident situation, the triggering signal 6 will not be generated at the appropriate time. Nevertheless, should an accident then occur, both the main accelerometer 2 and the supplementary accelerometer 3 will produce output signals. When these signals are received by the second processor unit 7, which carries out the back-up algorithm, a signal is passed from the second processor unit 7 to the OR-gate 5 which responds to that signal by generating the triggering signal 6. Thus, the triggering signal 6 is still generated, albeit at a slightly later instant than the optimum instant.

In the described embodiment processor units 4, 7 are separate units on separate printed circuit boards, and thus there is a minimum risk of a single error causing failure of the total system.

Figure 2:
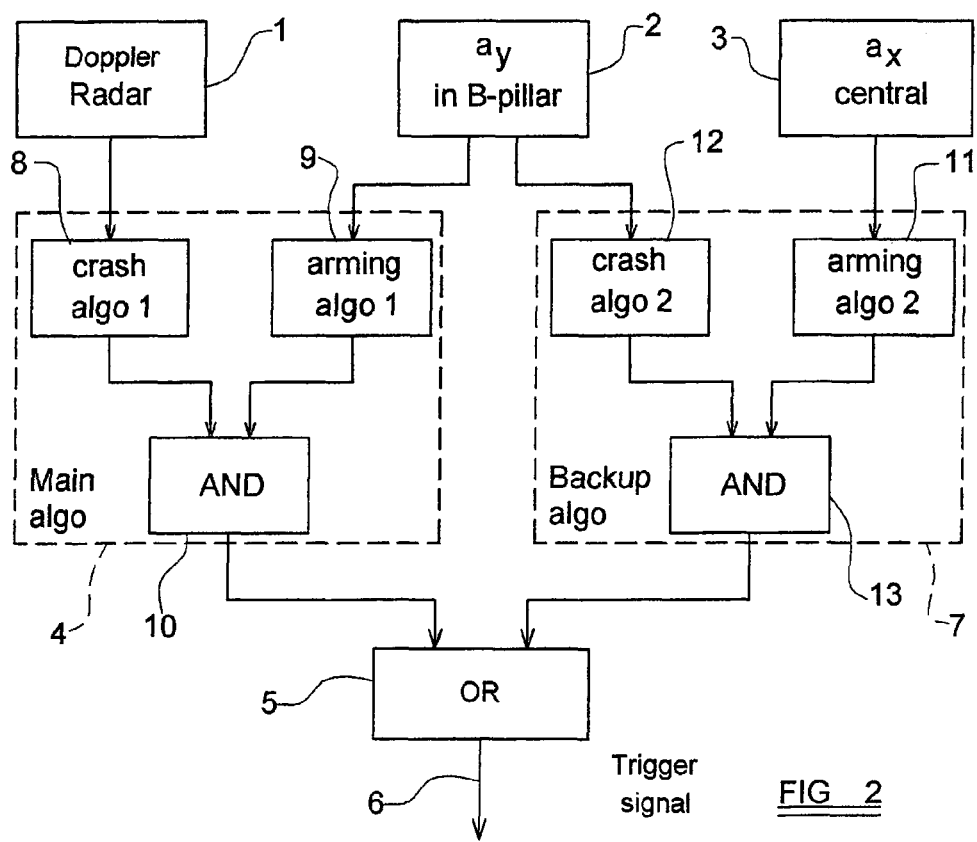
FIG. 2 is a block diagram of the second embodiment of the invention.

The embodiment described in FIG. 1 is relatively simple and straight forward. FIG. 2 illustrates a more complicated arrangement.

In the arrangement of FIG. 2, the proximity sensor 1 is a doppler radar which, in this embodiment, is directed towards the side of the vehicle to determine a potential side impact. The doppler radar produces an output signal $v_{yrel}$, which is a signal representative of the relative velocity of an object, such as another vehicle, with which a side impact is about to occur.

The main accelerometer 2 is, in this embodiment, an accelerometer which is mounted in the "B-pillar" of the vehicle and is responsive to lateral acceleration $a_y$.

The supplementary accelerometer 3 is a centrally mounted accelerometer which may be especially sensitive to an acceleration $a_x$ which is parallel with the longitudinal axis of the vehicle. However, the supplementary accelerometer could also be an accelerometer responsive to transverse acceleration, $a_y$.

In the embodiment of FIG. 2, the processor unit 4 incorporates two sub-processor units 8, 9 together with an AND-gate 10. The first sub-processor unit 8 performs an algorithm, a first "crash algorithm", on an input signal received from the doppler radar proximity sensor 1. When the crash algorithm produces an output, the output is supplied as an input to the first AND-gate 10.

The second sub-processor unit 9 receives an input from the accelerometer 2 and performs an algorithm, a "first arming algorithm", on that input signal. When an output is generated by the sub-processor unit 9 it is supplied to the AND-gate 10. When the AND-gate 10 receives inputs from each of the sub-processor units 8, 9, an output is generated, which is fed to the OR-gate 5.

Similarly, the second processor unit 7 incorporates a first sub-processor unit 11, a second sub-processor unit 12 and an AND-gate 13. The first sub-processor unit 11 receives a signal from the supplementary accelerometer 3, and performs an algorithm, the second "arming algorithm", to produce an output signal which is supplied to the AND-gate 13. The second sub-processor unit 12 receives an input signal from the main accelerometer 2 and performs an algorithm, the second "crash algorithm", to provide an output which is also supplied to the AND-gate 13. When the AND-gate 13 receives signals from both the sub-processor unit 11 and the sub-processor unit 12, an output signal is generated which is passed to the OR-gate 5.

In this embodiment it is preferred that each of the sub-processor units 8, 9, 11, 12 is formed as a separate hardware unit, although the arming and crash sub-processor units 8 and 9 may be a single composite unit, and the arming and crash sub-processor units 11 and 12 may be a single composite unit. It may prove to be preferable for each discrete unit to be mounted on its own printed circuit board to minimise the risk of a single error causing inadvertent failure.

Figure 3:
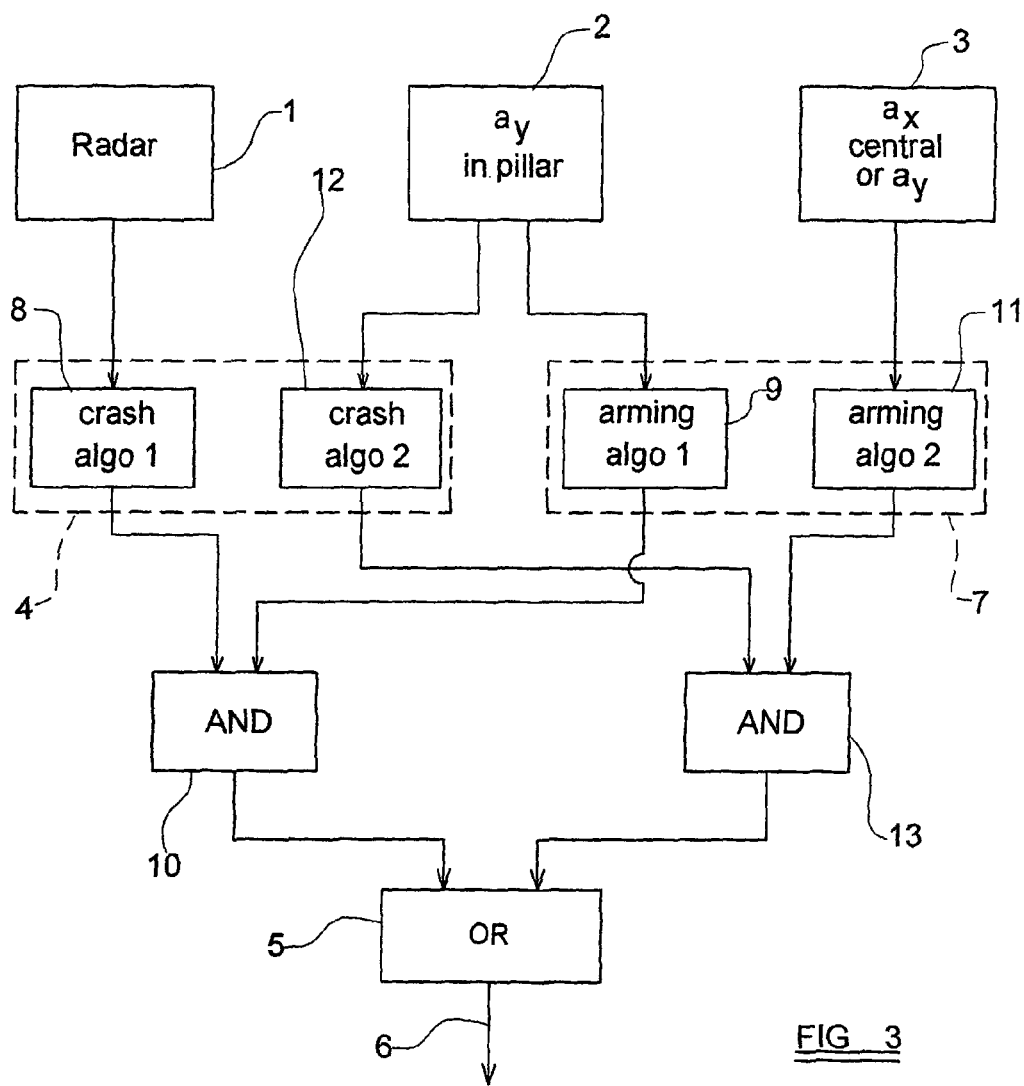
FIG. 3 is a block diagram of a third embodiment of the invention.

FIG. 3 illustrates an embodiment which, in many respects, is similar to that of FIG. 2. In an embodiment of FIG. 3 there is again a proximity sensor 1 in the doppler radar and a main accelerometer 2 in the form of an accelerometer responsive to lateral acceleration $a_y$. There is also a supplementary accelerometer 3, which again may be especially sensitive to an acceleration $a_x$ but which also could be responsive to a transverse acceleration $a_y$.

In the embodiment of FIG. 3 there is a main processor unit 4. The main processor unit 4 incorporates a first sub-processor unit 8 to perform the first crash algorithm and a second sub-processor unit 12 which performs the second crash algorithm. The processor units 8 and 12 receive signals from the radar 1 and the main accelerometer 2.

There is a second processor unit 7 which incorporates a first sub-processor unit 9 to perform the first arming algorithm, and a second sub-processor unit 12 to perform the second arming algorithm. The sub-processor units 9 and 11 receive signals from the main accelerometer 2 and the supplementary accelerometer 3.

The main processor unit 4 and the second processor unit 7 may be formed of separate processor units or may be printed circuit boards on which integral separate sub-processor units are mounted.

As in the embodiment of FIG. 2 in the embodiment shown in FIG. 3, the output of the sub-processor units which perform the first crash algorithm and the first arming algorithm, sub-processor units 8 and 9 as described above, are connected to the first AND-gate 10 and the outputs of the sub-processor units which form the second arming algorithm and the second crash algorithm, sub-processor units 11 and 12, are connected as inputs to the second AND-gate 13. The outputs of the AND-gates 10 and 13 are again connected to the OR-gate 5.

It is to be appreciated that if the sub-processor units 8 and 9 which perform the first crash algorithm and the first arming algorithm produce an output signal, the AND-gate 10 will produce an output signal, the AND-gate 10 will produce an output signal which will be passed to the OR-gate 5 to generate the trigger signal 6. Equally, if the sub-processor units 11 and 12 which perform the second arming algorithm and the second crash algorithm each produce an output signal, the AND-gate 13 will produce an output signal which will be passed to the OR-gate 5 to generate the trigger signal 6. Thus the trigger signal 6 will be generated regardless of which pair of sub-processor units generate outputs. Of course, if both pairs of sub-processor units generate an output, so that there is an output on each of the AND-gates 10 and 13, the trigger signal 6 will still be generated.

It is to be understood that for each of the two algorithms an inadvertent triggering should not happen due to one error only. Consequently the crash and arming algorithms are located in separate hardware units.

Figure 4:
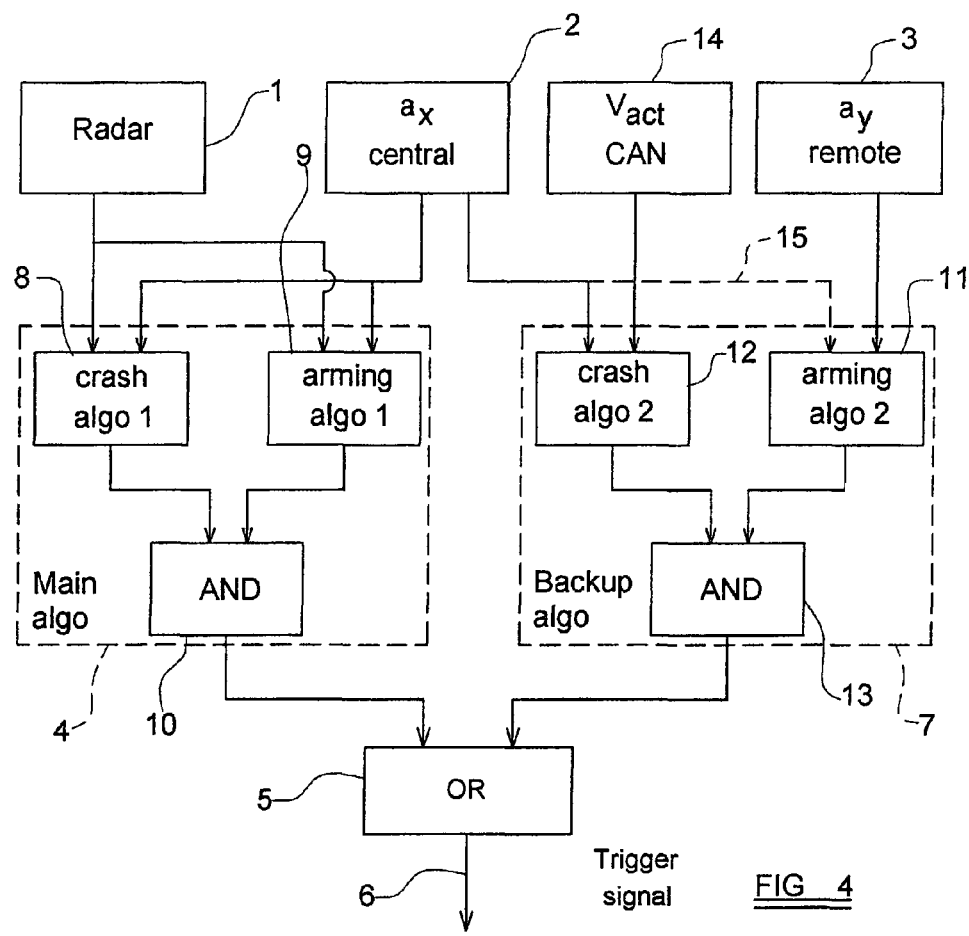
FIG. 4 is a block diagram of a fourth embodiment of the invention.

Turning now to FIG. 4, yet a further embodiment is illustrated. In this embodiment the proximity sensor 1 is in the form of a doppler radar which is to be mounted on the front of the vehicle, to sense the relative velocity $v_{xrel}$ of any object in front of the vehicle.

The main accelerometer 2, in this embodiment, is a centrally mounted accelerometer responsive to acceleration $a_x$ aligned with the longitudinal axis of the vehicle. The supplementary accelerometer 3 is an accelerometer which is primarily responsive to acceleration parallel with the lateral axis of the vehicle, that is to say an accelerometer provided primarily to be responsive to a side impact.

In this embodiment a further sensor 14 is provided which determines the actual velocity of the vehicle relative to the road, $V_{act}$, from the Controller Area Network (CAN) of the vehicle and produces a signal representative of $v_{act}$.

In the embodiment of FIG. 4, the first processor unit 4 incorporates a first sub-processor unit 8, a second sub-processor unit 9 and an AND-gate 10, as in the embodiment of FIG. 2. However, the first sub-processor unit 8 receives not only a signal from the doppler radar 1 but also a signal from the main accelerometer 2. Also the sub-processor unit 9 receives not only a signal from the main accelerometer 2 but also a signal from the radar 1.

The second processor 7 incorporates a first sub-processor unit 11, a second sub-processor unit 12 and an AND-gate 13 as in the embodiment of FIG. 2. The first sub-processor 11 receives a signal from the supplementary accelerometer 3 but may optionally, as indicated by the dashed line 15, receive a second signal from the main accelerometer 2.

The second sub-processor unit 12 receives an input signal from the main accelerometer 2 but, in this embodiment, also receives a signal from the further sensor 14 representative of the actual velocity, $v_{act}$, of the vehicle.

As in the previously described embodiments, the sub-processor units 8, 9, 11, 12 may be individual hardware elements mounted on different printed circuit boards. However, the various individual units could be combined in many different ways, to be an arrangement of composite units, for example, in a manner analogous to that of FIG. 3.

It is to be understood that in this embodiment of the invention sophisticated algorithms may be used by the various sub-processor units 8, 9, 11, 12.

The first arming algorithm, as carried out by the sub-processor unit 9 may be such that an output signal is only generated if the sensed acceleration $a_x$ exceeds a predetermined threshold and the sensed relative speed $v_{xrel}$ exceeds a predetermined threshold, but preferably the algorithm is such that an output is generated by the sub-processor unit 8 only if the sensed acceleration $a_x$ exceeds a first threshold $a_1$ but does not exceed a second threshold $a_2$, and the sensed relative velocity $v_{xrel}$ exceeds a first threshold $v_1$ but does not exceed a second threshold $v_2$.

Similarly the second arming algorithm, as performed by the sub-processor unit 11, may be such that an output is only generated if the acceleration $a_y$ from the supplementary accelerometer 3 exceeds a first threshold and optionally also if the acceleration from the main accelerometer 2 exceeds a second threshold. However, preferably an output is only generated by the supplementary processor unit 11 which is performing the second arming algorithm if the acceleration from the supplementary accelerometer 3 exceeds a first threshold but does not exceed a second threshold and also if the acceleration from the main accelerometer 2 exceeds a third threshold but does not exceed a fourth threshold.

The first crash algorithm, as performed by the sub-processor unit 9 may be such that a function of relative velocity as measured by the radar 1, and acceleration $a_x$ as measured by the main accelerometer 2, should exceed a constant.

The second crash algorithm, as carried out by the sub-processor unit 12, may be such that a function of acceleration as measured by the main accelerometer and the actual velocity of the vehicle should exceed a constant. One example of such a crash algorithm could be $(\int a_x dt) - f(v_{act}) > 0$.

In the embodiment of FIG. 3, should an appropriate $V_{xrel}$ be determined by the doppler radar proximity sensor 1 and an appropriate $a_x$ be sensed by the main accelerometer 2, both the first crash algorithm as performed by the sub-processor unit 8 and the first arming algorithm as performed by the sub-processor unit 9 will produce outputs which pass to the AND-gate 10. Because the AND-gate 10 receives two signals simultaneously it will produce an output which is passed to the OR-gate 5. The OR-gate 5 will consequently act a signal generator which generates a trigger signal 6.

Should, for some reason, the radar proximity sensor 1 fail and an accident actually occurs without any signal being generated by the radar 1, then it is envisaged that both the main accelerometer 2 and the supplementary accelerometer 3 will generate output signals. These signals will be processed by the sub-processor units 11 and 12, together with an input representative of the actual velocity of the vehicle. If the sub-processor units 11 and 12 each produce an output, the outputs will be passed the AND-gate 13. The AND-gate 13 will then generate an output which is passed to the OR-gate 5. The OR-gate 5 will then act as a signal to generate the trigger signal 6.

As a person skilled in the art will readily appreciate, the above description is meant as an illustration of implementation of the principles of this invention. This description is not intended to limit the scope or application of this invention in that the invention is susceptible to modification, variation and change, without departing from the spirit of this invention, as defined in the following claims.

The invention claimed is:

1. An arrangement for triggering a motor vehicle safety device, comprising a proximity sensor configured to provide a proximity output related to a distance to an object or the relative speed between the object and the sensor, a main accelerometer sensitive to acceleration in a predetermined direction, and a supplementary accelerometer, a first processing arrangement to perform a main algorithm, the first processing arrangement being connected to receive the proximity output from the proximity sensor and an acceleration output from the main accelerometer and to provide a first output to a trigger signal generator, a second processing arrangement being connected to receive the acceleration output from the main accelerometer and a secondary acceleration output from the supplementary accelerometer, the second processing arrangement being connected to the trigger signal generator to generate the trigger signal.

2. An arrangement according to claim 1, wherein the proximity sensor is configured to provide the proximity output related to distance or relative speed, with the distance or relative speed being determined in a predetermined direction relative to the motor vehicle.

3. An arrangement according to claim 2, wherein the predetermined direction is substantially parallel with the longitudinal axis of the motor vehicle on which the arrangement is mounted.

4. An arrangement according to claim 2, wherein the predetermined direction is substantially parallel with the transverse axis of the motor vehicle on which the arrangement is mounted.

5. An arrangement according to claim 1, wherein the proximity sensor is a radar sensor.

6. An arrangement according to claim 5, wherein the radar is a doppler radar.

7. An arrangement according to claim 1, wherein the first processing arrangement is configured to perform a first crash algorithm and a first arming algorithm as ports of the main algorithm, and is configured to pass to the first output said signal generator only if signals are generated simultaneously from the first crash algorithm and the first arming algorithm.

8. An arrangement according to claim 7, wherein the first crash algorithm is performed on at least the proximity output received from the proximity sensor and wherein the first arming algorithm is carried out on at least the acceleration output from the main accelerometer.

9. An arrangement according to claim 8, wherein the first crash algorithm is also performed on the acceleration output received from the main accelerometer and the first arming algorithm is also carried out on the proximity output from the proximity sensor.

10. An arrangement according to claim 7, wherein separate hardware units are provided to perform the first crash algorithm and the first arming algorithm.

11. An arrangement according to claim 7, wherein one or more software controlled processors are provided as the first processing arrangements to perform first crash algorithm and the first arming algorithms.

12. An arrangement according to claim 7, wherein the second processing arrangement is configured to perform a second crash algorithm and a second arming algorithm as part of the main algorithm, and is configured to pass a second output to the signal generator only if signals are generated simultaneously from the second arming algorithm and the second crash algorithm.

13. An arrangement according to claim 12 additionally comprising an additional sensor configured to generate a velocity signal representative of the actual velocity of the motor vehicle, wherein the second arming algorithm is performed on the secondary acceleration output from the supplementary accelerometer; and wherein the second crash algorithm is performed on at least the acceleration output from the main accelerometer.

14. An arrangement according to claim 13, wherein the second crash algorithm is also performed on an additional sensor output from the additional sensor.

15. An arrangement according to claim 13, wherein the second arming algorithm is also performed on the acceleration output received from the main accelerometer.

16. An arrangement according to claim 12, wherein separate hardware units are provided to perform the second arming algorithm and the second crash algorithm.

17. An arrangement according to claim 12, wherein one hardware unit is provided to perform the first and second crash algorithms and another hardware unit is provided to perform the first and second arming algorithms.

18. An arrangement according to claim 16, wherein the separate hardware units are mounted on respective separate printed circuit boards.

19. An arrangement according to claim 17, wherein one or more software controlled processors are provided to perform the first and second algorithms.

* * * * *